Patented Sept. 29, 1942

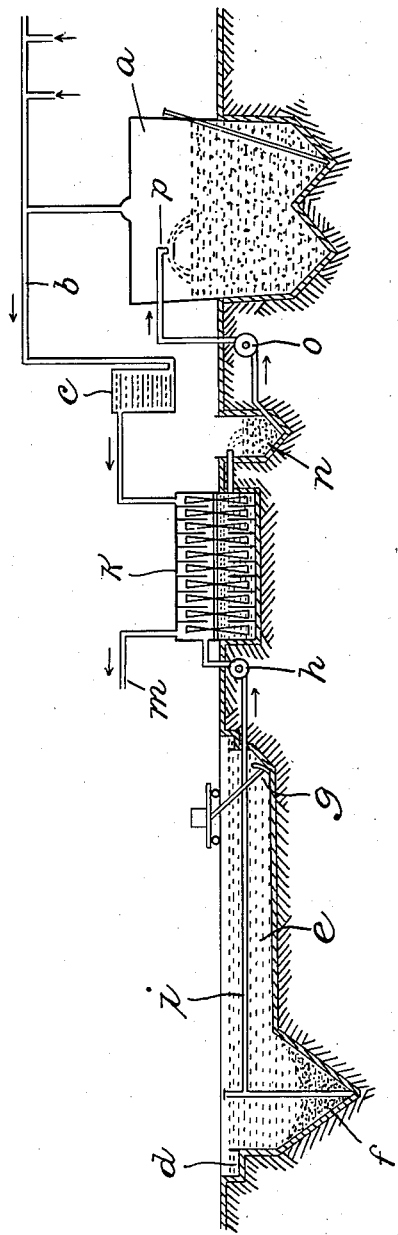

2,297,195

UNITED STATES PATENT OFFICE 2,297,195

PROCESS FOR RENDERING ALKALINE SLUDGE FROM SEWAGE PUTREFACTIBLE

Karl Behringer, Stuttgart, Germany; vested in the Alien Property Custodian

Application January 27, 1939, Serial No. 253,201

7 Claims. (Cl. 210—2)

It is already known how to produce clarifier gas (known in German as Klärgas) by putrefaction of the sludges of city sewage. This production of clarifier gas is disturbed by the sewage from tanneries and other plants or chemical operations which contain substances which are poisonous to the bacteria producing putrefaction. Pure tannery sludge acts so germicidal that upon mixing with putrefying clarifier sludge it immediately brings the gas evolution to a standstill. Therefore, hitherto it was necessary to separately deposit the accumulating tannery sludge and it formed a non-utilizable burdensome load.

If the great quantity of animal substances which arise from the skins treated in tanneries, and which are contained in the sludges of tannery sewage, were capable of putrefaction, much clarifier gas would be available therefrom. Hitherto, however, these animal substances were lost for utilization for these purposes of putrifection and supply of combustible (clarifier) gas.

As the result of new investigations and experiments, I have succeeded in rendering tannery sludge also utilizable for the production of clarifier gas and with great yields.

The invention rests upon the discovery made during the course of my investigations that the arresting action of the putrefaction of the tannery sludges is practically exclusively due to the hydroxides contained in it, namely to the caustic lime or calcium hydroxide. From this discovery, the germicidal action of the tannery sludges is eliminated by the addition of carbon dioxide to the sludge. By means of this addition of, or treatment with, carbon dioxide, the calcium hydroxide, which is contained in large quantities in the sludge, is converted into calcium carbonate, according to the following chemical equation:

$$Ca(OH)_2 + CO_2 \rightarrow CaCO_3 + H_2O$$

Thereby the pH value declines from 8.5 to 10 and more to 7.7 to 7.8.

The carbon dioxide is advantageously, at least in part, taken from the clarifier gas which, as is known, always contains a large proportion of carbon dioxide and thereby simultaneously the clarifier gas is made more valuable.

An especially advantageous example of the new process is explained below with reference to the accompanying drawing, which shows a complete schematic representation of an apparatus for practicing the process.

A putrefaction chamber of suitable kind is indicated by $a$, in which the clarifier sludge of sewage, with the exception of tannery sludge or sludge from tannery sewage, is brought. The crude clarifier gas, arising as a result of the putrefying process, is conducted to the gas collecting tube $b$ and from the latter is conveyed advantageously through desulphurizer $c$, which frees the clarifier gas of hydrogen sulphide and permits obtaining of sulphur.

The tannery sewage is conducted through a gutter $d$ to a shallow vessel $e$ from which the clarifier sludge is accumulated in a sump or pit $f$, advantageously under the action of a mechanically operated sludge remover $g$ in the shallow vessel $e$.

The sludge is withdrawn out of the sump $f$ by means of a suitable pump $h$ through pipe $i$ and is conducted to a carbon dioxide washer $k$ of any known or suitable kind. The washer $k$ shown in the drawing includes blades attached to a rotating shaft to agitate the sludge with the gases passing through the washer. Clarifier gas from a putrefying vessel of usual construction is simultaneously conducted counter current through the carbon dioxide washer, after it has passed through the desulphurizer $c$. The conversion of the caustic lime or calcium hydroxide into calcium carbonate then takes place in the carbon dioxide washer or scrubber $k$, accompanied by the utilization of the carbon dioxide contained in the clarifier gas. The clarifier gas, freed of carbon dioxide, and thereby made more valuable, is then conducted through the conduit $m$ to a suitable place of collection or use.

The tannery clarifier sludge which has been treated in carbon dioxide washer $k$ passes into a sump $n$ of a pump $o$, which conveys it by way of a distributor $p$, of usual construction, into the putrefaction vessel $a$. There it is activated by the clarifier sludge in the process of putrefying and it likewise is putrefied or fermented, so that it also is made useful for the production of clarifier gas.

In such cases, in which the carbon dioxide arising from the putrefying process does not suffice for the adequate treatment of the tannery sludge, naturally carbon dioxide obtained in other ways must be added. For this purpose, is available for use such carbon dioxide, among others, which arises by the burning of the clarifier gas in furnaces or internal combustion engines.

The putrefied sludge arising from the production of the clarifier gas is also valuable for fertilizing purposes, for example, for use in fecal peat, because it no longer can drive out ammonia nitrogen from the fertilizer and soil as does the original tannery sludge of alkaline reaction.

Not merely tannery sludges in the narrowest sense of the word can be successfully subjected to the new process, but of course also sludges of other origin, however essentially of the same nature or composition as tannery sludge.

I claim:

1. Process for treating sewage, the sludge of which is not putrefactible owing to its content of calcium hydroxide, which comprises separating sludge from the said sewage, treating the separated sludge with carbon dioxide prior to subjecting the sludge to putrefaction and thereby converting the calcium hydroxide content of the sludge into calcium carbonate to such an extent that the sludge becomes putrefactible, and thereafter subjecting the sludge to putrefaction.

2. Process for treating sewage, the sludge of which is not putrefactible owing to its content of calcium hydroxide, which comprises separating sludge from the said sewage, contacting the separated sludge with carbon dioxide prior to subjecting the sludge to putrefaction and thereby converting the calcium hydroxide content of the sludge into calcium carbonate to such an extent that the sludge becomes putrefactible, thereafter subjecting the sludge to putrefaction with production of gas containing carbon dioxide, and contacting sludge from said sewage with said gas prior to subjecting it to putrefaction in order to convert calcium hydroxide contained in said sludge into calcium carbonate.

3. Process for treating sewage, the sludge of which is not putrefactible owing to its content of calcium hydroxide, which comprises separating sludge from said sewage, adjusting the pH value of said sludge to about 7.7 to 7.8 with carbon dioxide, and thereafter subjecting the sludge to putrefaction.

4. Process for treating calcium hydroxide containing sewage from tanneries which comprises separating sludge from said sewage, contacting said separated sludge with carbon dioxide prior to subjecting said sludge to putrefaction to render it putrefactible, and thereafter subjecting the sludge to putrefaction.

5. Process for treating calcium hydroxide containing sewage from tanneries which comprises separating sludge from said sewage, contacting said separated sludge with carbon dioxide prior to subjecting said sludge to putrefaction to render it putrefactible, thereafter subjecting the sludge to putrefaction with the production of a gas containing carbon dioxide, and utilizing said last mentioned carbon dioxide in treating said sludge to render it putrefactible.

6. Process for treating calcium hydroxide containing sewage from tanneries which comprises separating sludge from said sewage, contacting said separated sludge with carbon dioxide prior to subjecting said sludge to putrefaction to render it putrefactible, thereafter subjecting the sludge to putrefaction with the production of a gas containing carbon dioxide and hydrogen sulphide, removing the hydrogen sulphide from said gas, and utilizing the remaining portions of said gas, which contain carbon dioxide, in treating the said sludge to render it putrefactible.

7. Process for treating calcium hydroxide containing sewage from tanneries which comprises separating sludge from said sewage, contacting said separated sludge with carbon dioxide until it has a pH value of about 7.7 to 7.8, thereafter subjecting the sludge to putrefaction with the production of a gas containing carbon dioxide, and utilizing said last mentioned carbon dioxide for contacting with sludge separated from said sewage.

KARL BEHRINGER.